April 7, 1936.  W. T. HONISS  2,036,872
FOREHEARTH FOR MOLTEN GLASS
Filed July 17, 1935
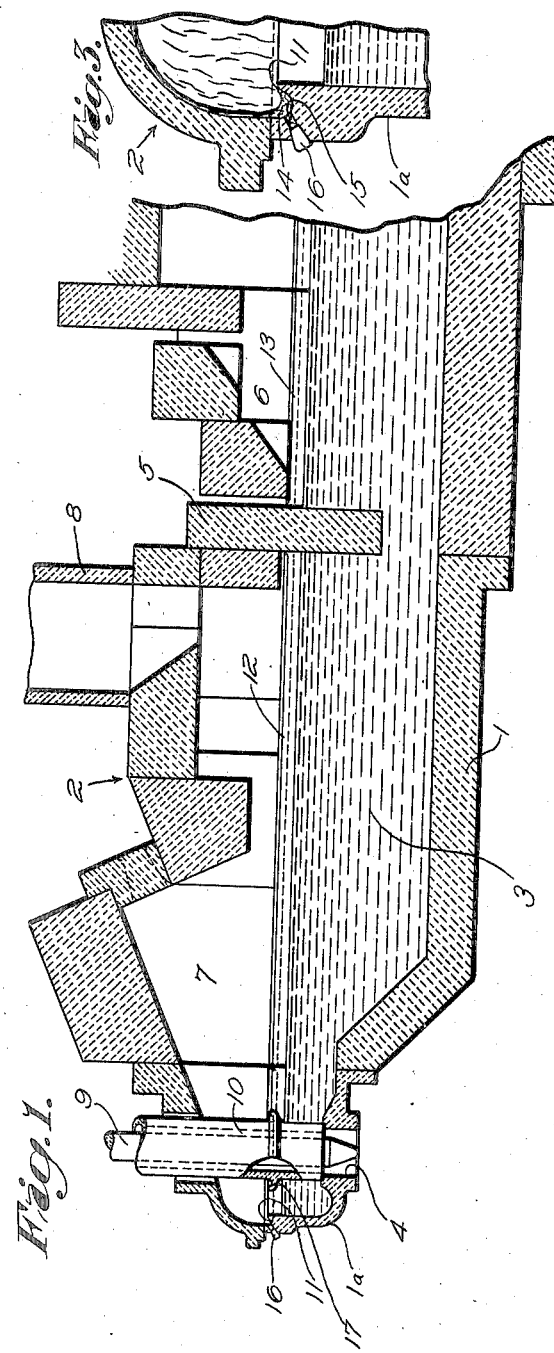
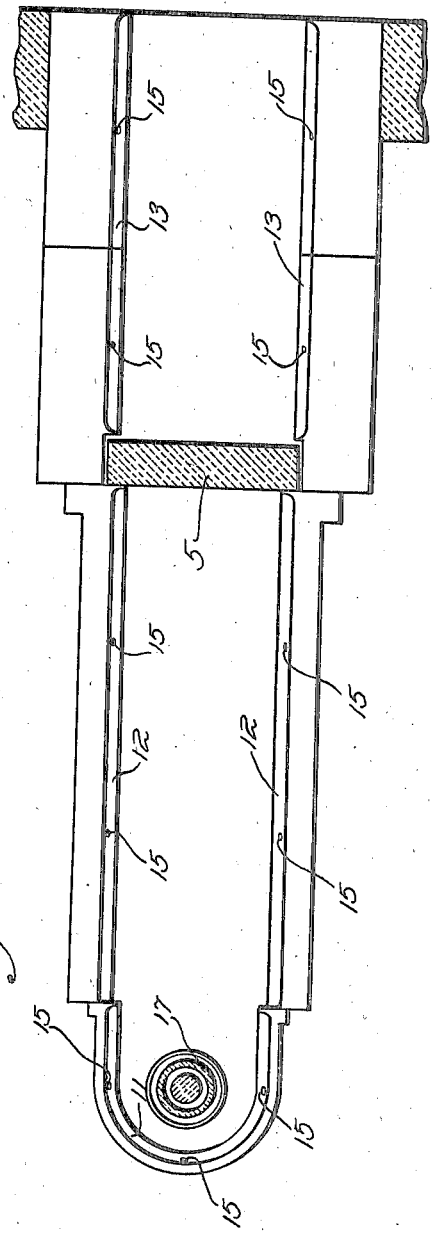
Witness:
W. B. Thayer.
Inventor:
William T. Honiss
by Brown & Parham
Attorneys Patented Apr. 7, 1936

2,036,872

UNITED STATES PATENT OFFICE 2,036,872

FOREHEARTH FOR MOLTEN GLASS

William T. Honiss, West Hartford, Conn., assignor to Hartford-Empire Company, Hartford, Conn., a corporation of Delaware Application July 17, 1935, Serial No. 31,785

10 Claims. (Cl. 49—54)

This invention relates to improvements in forehearths for receiving molten glass from a melting furnace or like source of supply and for conducting such glass to a feed spout, basin or other delivery chamber from which glass is to be fed, gathered, drawn or otherwise removed.

The invention has particular application to a forehearth of which the outer end portion constitutes a feed basin, spout, or chamber, having an outlet in its bottom submerged by the glass therein and from which glass is fed for the production of mold charges.

It is desirable that the glass in a forehearth of the character referred to should be kept as free as possible from contamination by any foreign matter during its passage from the source of supply to and through the feed outlet and that the glass fed should be as nearly homogenous and uniform in temperature as possible. Any devitrified matter or other contaminating substance in the glass that is fed from the outlet and from which mold charges are obtained may cause defects in or impair the quality or appearance of the articles of glassware into which such charges subsequently are formed.

The interior of a forehearth of the character described is kept at a relatively high temperature, being subjected to the action of heat from the glass and usually also from burners or other heating means. The refractory walls of the forehearth above the glass therein are, in service, soon coated with a brownish glaze. Glaze likewise may form on the exposed surface of any refractory member, such as a refractory tubular member that depends into the glass in the delivery chamber and controls flow of glass to the outlet. Portions of this glaze, as it forms or subsequent thereto, may travel downwardly on the inner surfaces of the forehearth walls and on the refractory tubular member into the body of molten glass in the forehearth. At approximately the glass level, this glaze apparently mixes with the glass and portions thereof may travel downwardly in the glass to the outlet and form cords or other defects in the subsequently produced glass charges.

An object of the invention is to obviate contamination of the glass in such a forehearth, particularly in the glass delivery portion thereof, by excluding from the glass therein glaze from the inner walls of the forehearth above such glass and from the exposed surface of the tubular member. To attain this object, the invention may provide a gutter or glaze collector at the interior of the forehearth walls at or but a short distance above the level of the glass therein.

A practical embodiment of the invention is illustrated in the accompanying drawing, in which:

Figure 1 is a longitudinal vertical section of a forehearth equipped with glaze collecting gutters on its inner walls and on its flow-controlling tubular member, the view showing only such parts of the forehearth and associate structures as are believed necessary for an understanding of the invention;

Fig. 2 is a plan view, partly in section, of the lower portion of the forehearth structure of Fig. 1; and Fig. 3 is a relatively enlarged fragmentary transverse vertical sectional view of a portion of the feed spout or delivery chamber at the outer end of the forehearth, showing the manner in which the glaze collecting gutter intercepts downwardly moving glaze on a wall of the forehearth and also showing one way of effecting removal of the matter collected by the gutter.

In the drawing, a forehearth includes a lower or glass conducting channel portion 1 and an upper or cover structure 2. This forehearth may be attached to or operatively connected in any suitable known way with a melting furnace or other source of supply of molten glass so that a supply body of molten glass, designated 3, will fill the channel portion 1 to a predetermined level and will submerge a feed outlet 4 in a feed bowl, spout or chamber 1—a which constitutes the outer end portion of the channel portion.

The forehearth structure may be formed of suitable known material or materials in any suitable known way, refractories being employed for the portions thereof which are subjected to high temperatures.

As shown, the interior of the forehearth is divided transversely above the glass in the flow channel portion thereof by a transverse separator or partition block 5 which may extend from the cover structure 2 into the glass supply body 3 to a substantial distance below the surface of such glass supply body. The space within the forehearth above the glass level thus is divided into a rear chamber 6 and a front chamber 7.

As shown, the front chamber 7 has a stack 8 and, in use, may be provided with burners or other suitable heating means (not shown) so that the temperature and draft conditions in the front chamber 7 may be controlled and regulated independently of like conditions in the rear chamber of the forehearth.

The outlet 4 is shown more or less diagrammatically and any suitable known outlet structure may be employed.

The feeding of glass from the supply body through the outlet for the production of mold charges may be under the control of any suitable known feeding means, such as that represented by the vertical refractory implement 9 and its surrounding refractory tube 10.

The parts which have been described so far do not per se form any part of the invention and they may vary widely from those shown in the drawing.

To carry the invention into effect, the forehearth may be provided with a glaze collector in the form of a substantially horizontal gutter which is located at the inner side of the forehearth walls slightly above but as close as possible to the highest level to which the forehearth channel will be filled with molten glass at any time. As shown in the drawing, this gutter is formed in the refractory walls of the forehearth at a place at which such walls are inwardly shouldered or project inwardly beyond the adjacent portion of the upper or cover structure of the forehearth. The particular forehearth structure that is shown has its glass receiving channel portion constructed to be of different widths at different places along its length, the side walls of each of the portions of different width being laterally offset with respect to the side walls of the adjacent portion or portions, as best seen in Fig. 2. For such a forehearth structure, the gutter advantageously may comprise separate sections for the forehearth channel portions of different width. For example, the gutter shown comprises a front section 11, extending around the inner side of the walls of the feed spout or chamber 1—a, intermediate side sections 12 at the sides of the portion of the channel beneath the remainder of the chamber 7, and rear side sections 13 at the sides of the portion of the channel rearwardly of the transverse separator block 5. Where the forehearth structure will permit, the gutter may be formed as one continuous groove or channel extending around the inner side of the walls of the feed spout or delivery chamber and rearward at the sides of the remainder of the glass-conducting channel for the full length or any predetermined portion of the length thereof. Also, the gutter may be formed of refractory members which are separate from the main blocks of the forehearth walls and then may be secured or supported in the desired position in the forehearth in any suitable known manner.

In operation, a forehearth provided with a glaze-receiving gutter substantially as above described will prevent contamination of the glass by such glaze as the downwardly traveling portions of the latter which otherwise would in time reach the glass line are caught and retained in the gutter, substantially as indicated at 14 in Fig. 3. The gutter may be provided at its bottom with drain openings 15 at suitable places along its length to effect removal from the forehearth of the collected glaze while the forehearth is still in operation. These drain openings may be closed at their outer ends by suitable removable and replaceable or renewable stoppers or closures 16 and the collected glaze drained from the gutter only at intervals or the drainage openings might be left continuously open and suitable provision be made, if required, to take care of more or less continuous drainage therefrom.

A gutter 17 on the tubular member 10 will catch downwardly moving glaze or foreign glass contaminating matter thereon and will prevent such matter from descending into the glass. This tubular member may be raised from the forehearth and the collected matter removed if such matter is of sufficient amount to require removal before the replacement of the tube is necessary as an ordinary incident of the service for which such tube is intended.

The present invention is believed to be broadly novel in the conception thereof that the glaze or foreign matter on the inner surfaces of the walls of a glass feeding forehearth or on any other wall therein, such as the exposed surface of the tube 10, should be collected and prevented from descending into the molten glass in such forehearth and in the provision of means designed, adapted and intended to effect this result.

The invention is not limited to the details of the structure shown in the accompanying drawing. The word "wall", as used in the broader of the appended claims, is to be given a meaning sufficiently broad to read on the exposed surface of the tubular member 10 or of any other refractory member that extends above the surface of the glass in the forehearth and is exposed to temperature or other conditions in the forehearth that will cause glaze or other foreign matter to form or collect thereon and to tend to move downwardly thereon toward the glass in the forehearth.

I claim:

1. A container adapted to hold a supply body of molten glass, a wall extending above the level of the glass of said supply body, and means for preventing downwardly moving foreign matter on said wall from descending into said supply body.

2. A container adapted to hold a supply body of molten glass, a wall extending above the level of the glass of said supply body, and means for intercepting and collecting above the glass level downwardly moving foreign matter on said wall.

3. A container adapted to hold a supply body of molten glass, a wall extending above the level of the glass of said supply body, means for intercepting and collecting above the glass level downwardly moving foreign matter on said wall, and means for removing the collected matter from the container.

4. A forehearth or like container for molten glass having a glass delivery chamber and a space above the glass therein, said space having refractory side walls on which glaze forms during the operation of said forehearth or like container, and means for collecting at a place above the glass level but adjacent thereto the portions of such glaze that travel downwardly on said side walls toward the glass in said chamber.

5. The combination with a forehearth or like container for molten glass having a glass delivery chamber provided with a submerged glass discharge outlet, a refractory glass discharge controlling member having an exposed wall extending above the glass in said delivery chamber, and means for intercepting and collecting above the glass level downwardly moving glaze or foreign matter on said exposed wall.

6. A forehearth having a glass feed chamber provided with an outlet submerged by a body of molten glass in said chamber, said chamber having side walls extending above the glass therein on which glaze forms during the operation of said forehearth, and a gutter above but adjacent to the glass level for intercepting and collecting such portions of the glaze as travel downwardly on said side walls from a higher level.

7. A forehearth having a glass feed chamber provided with an outlet submerged by a body of molten glass in said chamber, said chamber having side walls extending above the glass therein on which glaze forms during the operation of said forehearth, and a gutter above but adjacent to the glass level for intercepting and collecting such portions of the glass as travel downwardly on said side walls from a higher level, said gutter having a drain opening extending from the bottom of the gutter to the exterior of the forehearth.

8. The combination with a forehearth or like container having a glass delivery chamber provided with a submerged discharge outlet, of a tubular refractory member dipping into the glass toward the discharge outlet and having an exposed portion above the glass in the delivery chamber, said tubular refractory member having a gutter on its exposed portion adjacent to the glass level.

9. The method of preventing contamination of the glass in the delivery chamber of a forehearth or like container by foreign matter that forms on a wall therein above the level of the glass therein and travels downwardly on such wall toward the glass, comprising intercepting and collecting such downwardly moving foreign matter before it descends into the glass.

10. The method of preventing contamination of the glass in the delivery chamber of a forehearth or like container by foreign matter that forms on a wall therein above the level of the glass therein and travels downwardly on such wall toward the glass, comprising collecting the downwardly moving foreign matter at a level above but adjacent to the level of the glass in said chamber as such matter descends on said wall toward the glass, and removing the collected foreign matter from the delivery chamber.

WILLIAM T. HONISS.